UNITED STATES PATENT OFFICE.

REINHOLD ROSTOCK, OF KLOSTERNEUBURG, AUSTRIA-HUNGARY.

METHOD FOR PROVIDING CEMENT OR CONCRETE CASKS WITH A PROTECTIVE COATING.

No. 884,994.  Specification of Letters Patent.  Patented April 14, 1908.

Original application filed March 11, 1907, Serial No. 361,812. Divided and this application filed July 27, 1907. Serial No. 385,894.

*To all whom it may concern:*

Be it known that I, REINHOLD ROSTOCK, manufacturer, a subject of the Emperor of Germany, residing at Klosterneuburg, near Vienna, in the Empire of Austria-Hungary, have invented certain new and useful Improvements in Methods for Providing Cement or Concrete Casks with a Protective Coating.

This invention relates to cement or concrete casks which are provided with an internal coating for the purpose of preventing the contents of the cask coming into contact with the cement or concrete, and being thereby deteriorated.

Internal coatings of resin, varnish and the like have been directly applied to the cement or concrete, but it is found in practice that the coatings so applied are apt to scale off, so that the beer or other contents of the cask comes into direct contact with the cement or concrete, thereby deteriorating. In order to avoid this difficulty a lining of plaster has been first applied and then the protective coating of resin asphalt and the like was applied. These coatings do not penetrate the lining sufficiently, and consequently, easily scale off, especially in the case of mechanical influences, only forming a layer on top of the lining.

According to the present invention the lining of plaster, instead of the asphalt or tar coating, may be impregnated with liquefied ozocerite and ceresin. By employing these materials which not only contributes to the protective nature of the coating but augments the adhesion produced between the plaster coating and the cement of the cask itself, the lining is saturated with an inert substance, even the protective coating of resin, varnish, or the like may be dispensed with.

Having now particularly described and ascertained the nature of my said invention, and in what manner the same is to be performed, I declare that what I claim is:

The method of lining concrete casks with a protective coating whereby to produce an intimate adhesion between the cask and the coating which consists in applying to the surface of the cask a coating of plaster impregnated with ozocerite or ceresin, substantially as described.

In testimony whereof I have affixed my signature in presence of two witnesses.

REINHOLD ROSTOCK.

Witnesses:
AND. CLAUSEN,
OTTO HOLLAND.